US012695583B2

(12) United States Patent
He et al.

(10) Patent No.: US 12,695,583 B2
(45) Date of Patent: Jul. 28, 2026

(54) TCI INDICATION BASED CONTINUATION OF MULTIPLE-CELL ACTIVATION

(71) Applicant: APPLE INC., Cupertino, CA (US)

(72) Inventors: Qunfeng He, San Diego, CA (US); Dietmar Gradl, Munich (DE); Jie Cui, Cupertino, CA (US); Hongbo Yan, San Diego, CA (US); Amir Farajidana, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 613 days.

(21) Appl. No.: 17/935,045

(22) Filed: Sep. 23, 2022

(65) Prior Publication Data

US 2024/0106617 A1 Mar. 28, 2024

(51) Int. Cl.
H04L 5/00 (2006.01)
H04W 24/08 (2009.01)
(52) U.S. Cl.
CPC .......... H04L 5/0096 (2013.01); H04L 5/0051 (2013.01); H04W 24/08 (2013.01)
(58) Field of Classification Search
CPC ..... H04L 5/0096; H04L 5/0051; H04W 24/08
See application file for complete search history.

(56) References Cited

U.S. PATENT DOCUMENTS

| 2021/0329546 A1* | 10/2021 | Wang | H04W 76/15 |
| 2023/0007499 A1* | 1/2023 | Da Silva | H04W 24/02 |

FOREIGN PATENT DOCUMENTS

WO 2021064200 A1 4/2021

OTHER PUBLICATIONS

PCT/US2023/073735, International Search Report and Written Opinion, Jan. 3, 2024, 12 pages.

* cited by examiner

*Primary Examiner* — Joseph A Bednash
(74) *Attorney, Agent, or Firm* — Dorsey & Whitney LLP

(57) ABSTRACT

Systems and methods provide multiple cell activation. A user equipment (UE) receives, from a wireless network, a command to activate multiple cells simultaneously. In response, the UE initiates cell activation procedures for the multiple cells. The cell activation procedures include waiting for an active transmission configuration indicator (TCI) indication. The UE monitors for the active TCI indication on any of the multiple cells. In response to receiving the active TCI indication on a first cell of the multiple cells, the UE determines one or more second cells of the multiple cells that share a same spatial relationship with the first cell according to one or more predetermined rule, and autonomously continues the cell activation procedures for the first cell and the one or more second cells.

19 Claims, 6 Drawing Sheets

FIG. 1

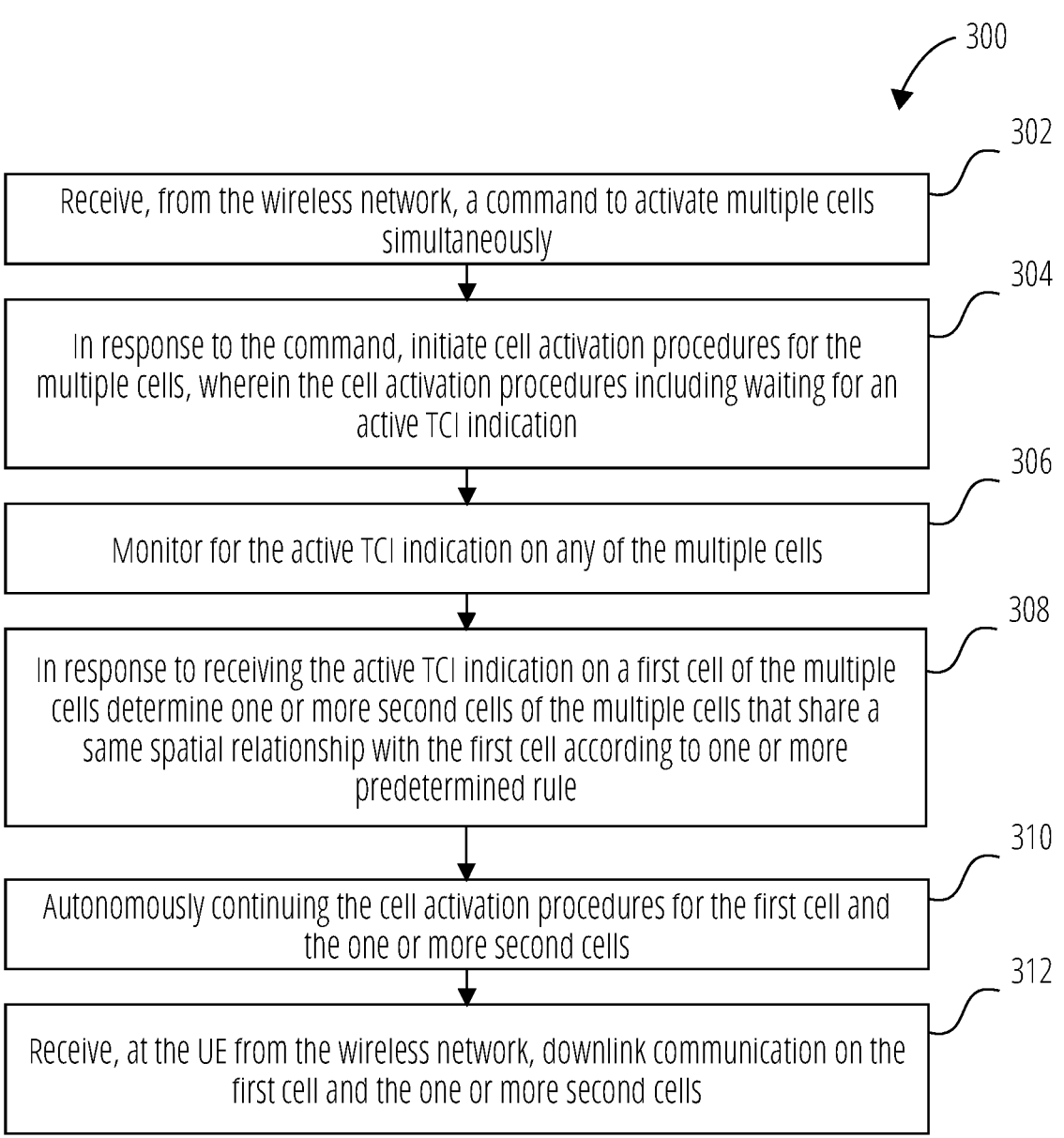

300

302

Receive, from the wireless network, a command to activate multiple cells simultaneously

304

In response to the command, initiate cell activation procedures for the multiple cells, wherein the cell activation procedures including waiting for an active TCI indication

306

Monitor for the active TCI indication on any of the multiple cells

308

In response to receiving the active TCI indication on a first cell of the multiple cells determine one or more second cells of the multiple cells that share a same spatial relationship with the first cell according to one or more predetermined rule

310

Autonomously continuing the cell activation procedures for the first cell and the one or more second cells

312

Receive, at the UE from the wireless network, downlink communication on the first cell and the one or more second cells

FIG. 3

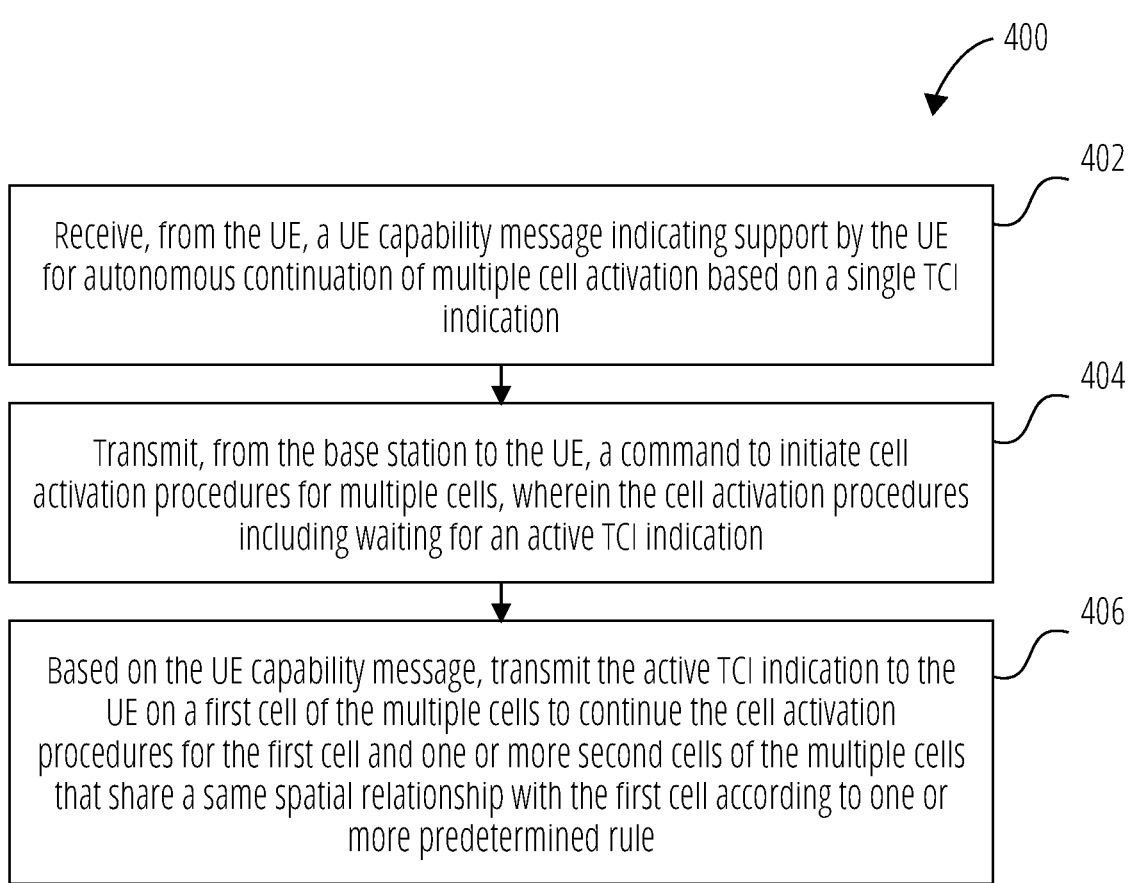

400

402

Receive, from the UE, a UE capability message indicating support by the UE for autonomous continuation of multiple cell activation based on a single TCI indication

404

Transmit, from the base station to the UE, a command to initiate cell activation procedures for multiple cells, wherein the cell activation procedures including waiting for an active TCI indication

406

Based on the UE capability message, transmit the active TCI indication to the UE on a first cell of the multiple cells to continue the cell activation procedures for the first cell and one or more second cells of the multiple cells that share a same spatial relationship with the first cell according to one or more predetermined rule

FIG. 4

TCI INDICATION BASED CONTINUATION OF MULTIPLE-CELL ACTIVATION

TECHNICAL FIELD

This application relates generally to wireless communication systems, including multiple cell activation for carrier aggregation (CA).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Note that in some systems, FR2 may also include frequency bands from 52.6 GHz to 71 GHz (or beyond). Bands in the millimeter wave (mmWave) range of FR2 may have smaller coverage but potentially higher available bandwidth than bands in FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 is an example plot illustrating the impact of a UE that waits for per-cell TCI activation.

FIG. 3 is a flowchart of a method for a UE to communicate in a wireless network according to one embodiment.

FIG. 4 is a flowchart of a method for a base station to communicate with a UE in a wireless network according to one embodiment.

DETAILED DESCRIPTION

Figure 2:
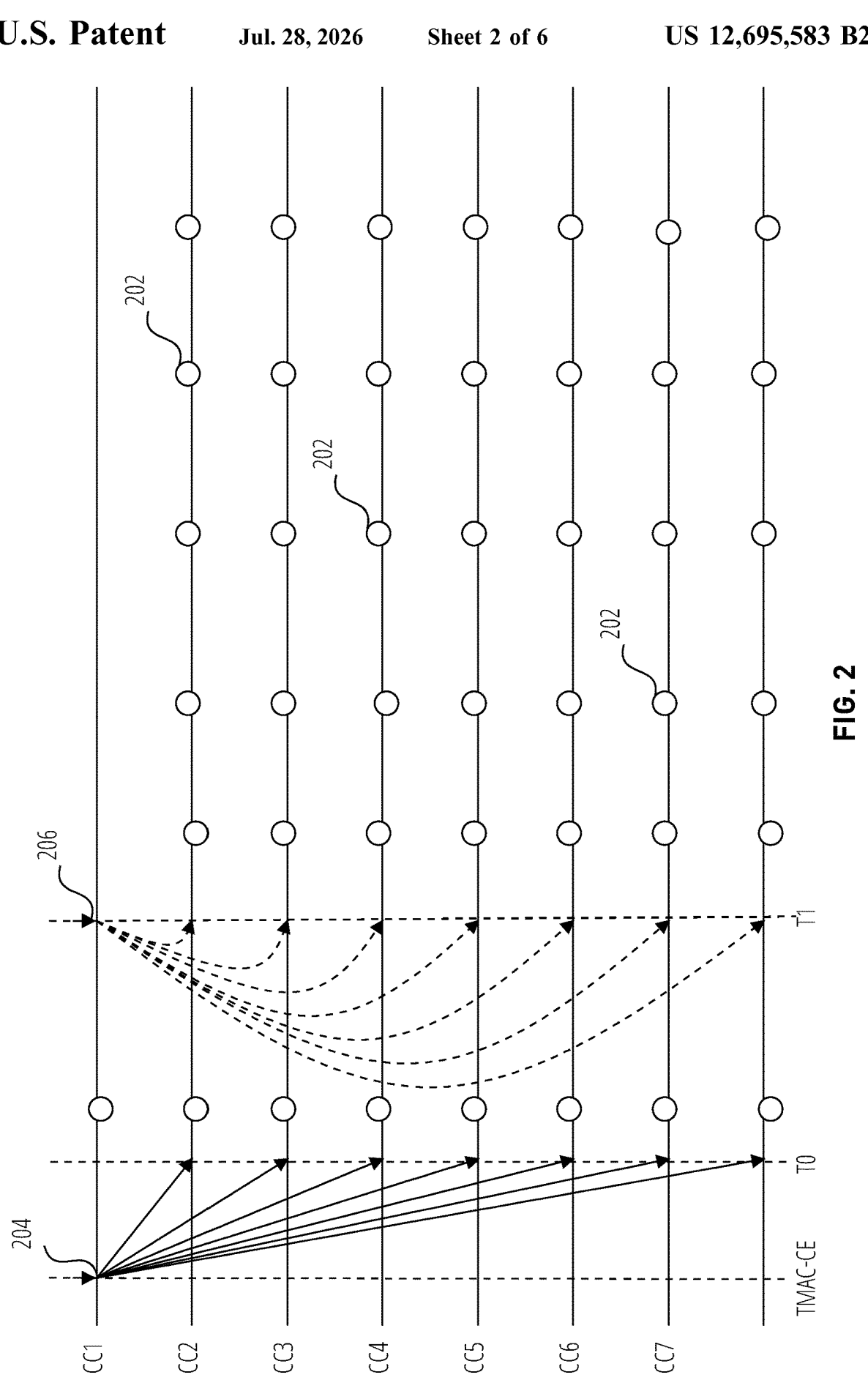
FIG. 2 is an example plot illustrating a TCI indication based continuation of multiple cell activation according to one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Embodiments disclosed herein facilitate the activation of multiple FR2 cells for carrier aggregation (CA). CA aims to aggregate fragmented spectrums for delivering higher capacity and balancing coverage. After the network (NW) adds and configures SCells (e.g., through radio resource control (RRC) signaling), the NW may perform single SCell activation for CA by initiating a procedure to request a UE to enable processing on a configured target SCell.

The procedure can be triggered by a media access control (MAC) control element (CE) command or through an SCell Activation/Deactivation procedure for a configured SCell. In response, UE behaviors include configuring the UE's radio frequency (RF) and baseband circuitry and processors for the parameters of the target SCell, detecting the target SCell (if needed), assisting the NW to select a downlink (DL) transmit beam and determining the UE's receive beam in FR2, refining the time and frequency offsets (TO/FO), and measuring and reporting a channel quality indicator (CQI). Different from legacy LTE, NR uses periodical discontinuous reference signals for above procedures. As a result, longer delay may be incurred while waiting for the next instance of the discontinuous reference signal (which may have a periodicity of, e.g., 20 ms, 40 ms, or 80 ms).

Further, complexity may be increased as the NW chooses to active multiple SCells simultaneously. Certain systems (e.g., 3GPP Release 16 (Rel-16)) impose a latency on multiple secondary cell (SCell) activation. For example, an activation delay includes a time period (e.g., Tuncertainty_

MAC_multiple_scells) between reception of an activation command for physical downlink control channel (PDCCH) transmission configuration indicator (TCI), physical downlink shared channel (PDSCH) TCI (when applicable) and the SCell activation command of an unknown SCell. The UE may be configured to apply the activation delay for each FR2 cell being activated.

When activating multiple FR2 intraband SCells, the multiple SCells may already be known to the UE and/or the multiple SCells may be unknown to the UE. For example, within a frequency band, some cells may be active, some cells to be activated may already be known to the UE, and some cells to be activated may not be known to the UE. For activating the multiple FR2 cells to a band without any active cells, the network indicates active TCI states for the target cells. A TCI state may indicate a directionality or a characteristic of the downlink beam, such as one or more quasi-colocation (QCL) property of a DL beam. A QCL property may include, for example, a Doppler shift, a Doppler spread, an average delay, a delay spread, or spatial receive parameters, among other examples. In some examples, each base station transmit beam may be associated with a synchronization signal block (SSB), and the UE may indicate a preferred transmit beam by transmitting uplink transmissions in resources of the SSB that are associated with the preferred transmit beam 305. A particular SSB may have an associated TCI state (for example, for an antenna port or for beamforming).

Since certain systems intend to reserve the flexibility of indicating the TCI state to each of the multiple FR2 cells being-activated, the UE is configured to hold the activation and wait for the TCI indication via a MAC-CE for each cell individually before proceeding with the activation of that cell. Although the NW has the flexibility of activating TCI individually, the fact that the UE by default holds the activation may add to the overall latency of completing activation of all of the cells. Some cells can proceed if they received TCI indications while other cells are hung up pending on the TCI indication via the MAC-CE command.

Figure 1:
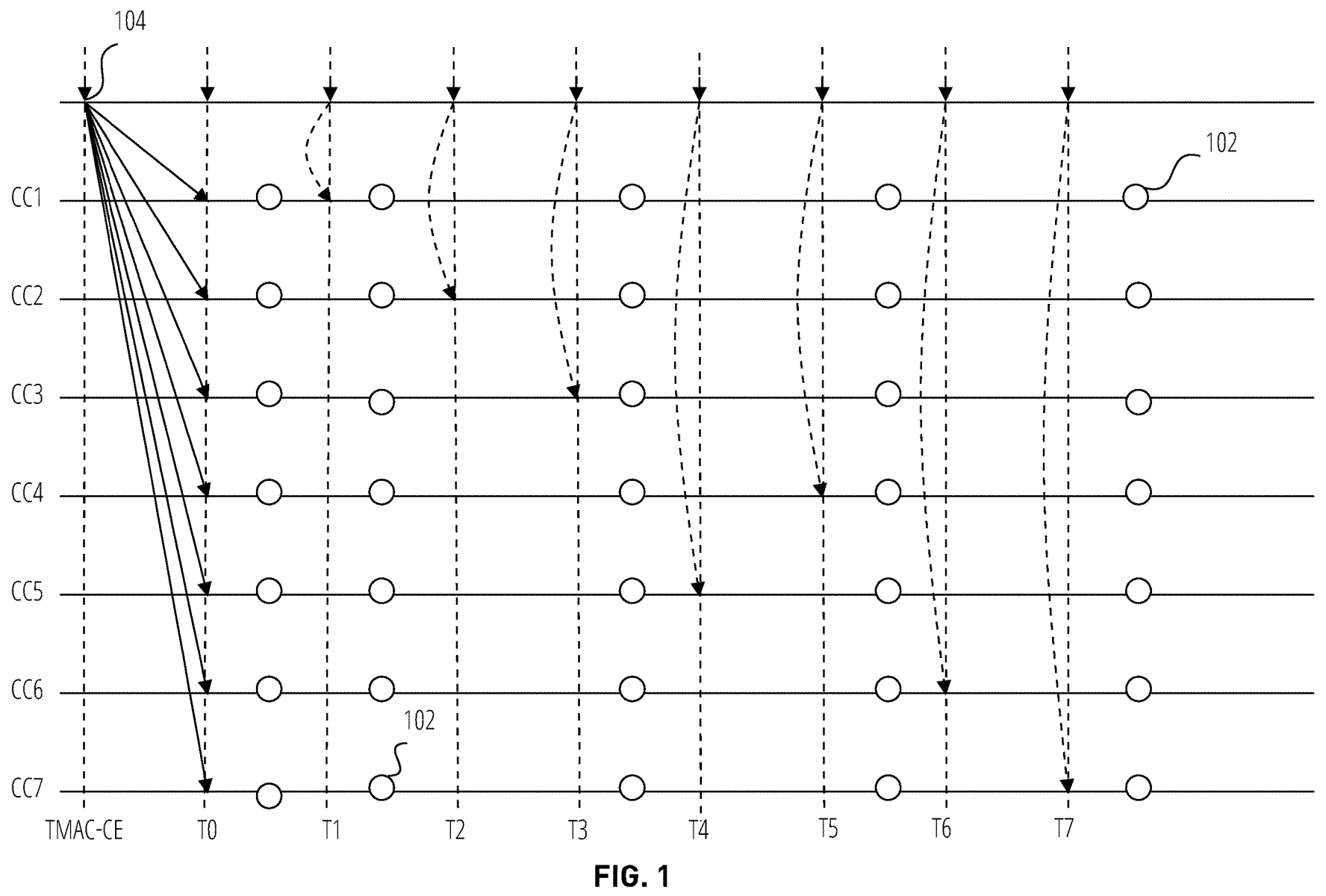

FIG. 1 is an example plot illustrating the impact of a UE that waits for per-cell TCI activation. The plot shows SSB bursts 102 for component carriers (CC1, CC2, CC3, CC4, CC5, CC6, and CC7) corresponding to respective cells to be activated. At time T$_{MAC-CE}$, a NW issues one MAC-CE command 104 to a UE for activating the multiple cells of CC1, CC2, CC3, CC4, CC5, CC6, and CC7. At time TO, activation starts for the multiple cells in parallel and pending on TCI indications.

At time T1, the UE receives from the NW an active TCI indication for the cell corresponding to CC1 and activation continues (i.e., the active TCI indication MAC-CE command can be received on another active special cell (sPCell) or active SCell in another band. At time T2, the UE receives from the NW an active TCI indication for the cell corresponding to CC2 and activation continues. At time T3, the UE receives from the NW an active TCI indication for the cell corresponding to CC3 and activation continues. At time T4, the UE receives from the NW an active TCI indication for the cell corresponding to CC4 and activation continues. At time T5, the UE receives from the NW an active TCI indication for the cell corresponding to CC5 and activation continues. At time T6, the UE receives from the NW an active TCI indication for the cell corresponding to CC6 and activation continues. At time T7, the UE receives from the NW an active TCI indication for the cell corresponding to CC7 and activation continues. The overall latency is determined by the last cell (corresponding to CC7) that receives the TCI indication. In other words, the overall latency is increased by the delay between the time T1 and the time T7.

Note that for a particular cell, once the UE receives the TCI indication, the UE can decide to further perform time offset refinement and/or continue with a channel state information (CSI) reference signal (RS) measurement and CSI reporting for link adaptation. Therefore, the longer a CC being-activated waits for the TCI indication, the longer the overall delay.

By contrast, certain embodiments disclosed herein allow the rest of the cells to continue with CA activation procedures as long as one out of the multiple cells receives the TCI indication based on the assumption that multiple intraband FR2 cells are co-located (e.g., as of 3GPP Rel-16). To be spatially co-located, two cells share the same DL direction. Thus, cases of co-located CA deployment may be identified to exploit the fact that multiple serving cells share the same spatial relationship. In certain systems, for example, a UE may assume that the transmitted signals from the serving cell should have the same DL spatial domain transmission filter on one orthogonal frequency division multiplexing (OFDM) symbol in the same band in FR2. In addition, or in other embodiments, the co-located assumption may be extended to FR1, within the same band, for cells that are contiguous in the frequency domain. Thus, under certain assumptions or conditions in FR2 and/or FR1, if one of the serving cells being activated receives the active TCI indication by the NW, the rest of the pending serving cells can autonomously resume the activation procedure.

For example, FIG. 2 is an example plot illustrating a TCI indication based continuation of multiple cell activation according to one embodiment. Similar to FIG. 1, the plot in FIG. 2 shows SSB bursts 202 for component carriers CC1, CC2, CC3, CC4, CC5, CC6, and CC7 corresponding to respective cells to be activated. At time T$_{MAC-CE}$, a NW issues one MAC-CE command 204 to a UE for activating the multiple cells of CC1, CC2, CC3, CC4, CC5, CC6, and CC7. At time TO, activation starts for the multiple cells in parallel and pending on TCI indications.

At time T1, the NW transmits an active TCI indication 206 for any one of the multiple cells of CC1, CC2, CC3, CC4, CC5, CC6, and CC7. When the UE receives the TCI indication 206 for any of the cells being activated, rather than waiting for an explicit TCI indication from the NW for each cell, the UE may autonomously resume the activation procedure for one or more (or all) of the other cells being activated. Thus, as compared to the example shown in FIG. 1, there is a much shorter latency and multiple cells share similar activation delay. Further, the NW reduces signaling overhead by avoiding multiple TCI indication MAC-CE commands. In addition, certain embodiments provide the flexibility to be applied in either FR2 or FR1, when certain predefined conditions are met.

In one embodiment, when the UE waits for the active TCI indications in the process of activating multiple cells simultaneously, the UE monitors whether an active TCI indication is received for any one or more cells being-activated, and checks whether any other cells being-activated share the same spatial relationship (e.g., TCI state) according to predetermined rules. The UE then autonomously continues the activation procedure for those cells that share the same spatial relationship. The predetermined rule may be based on a common understanding or predefined criteria between infrastructure and UEs. For example, within the same band in FR2, the serving cells may share the same downlink spatial filter. As another example, within the same band in FR1, frequency contiguous serving cells may share the same downlink spatial filter. As yet another example, the NW and UE may agree that consecutively numbered cell identifiers (IDs) can be assumed to be co-located. Skilled persons will recognize from the disclosure herein that the rules are not limited to these examples and that other predetermined rules may be applied.

In certain embodiments, a set of serving cells sharing the same TCI state are defined as a TCI cell group. Upon receiving an active TCI indication for any one of the cells being activated, the UE autonomously continues the activation procedure for the other cells in the same TCI cell group.

In one embodiment, the UE determines to autonomously continue activating all of the other cells being-activated in the same TCI cell group by proceeding with additional procedures of refining the time offset and measuring the CSI-RS signal for link adaptation. In certain such embodiments, extra conditions are imposed to trigger the continuation of activation for other cells in the same TCI cell group. The conditions can be measurement based or RRC configuration based. For example, a measured signal-to-noise ratio (SNR) condition of the QCL src SSB on those cells are on par as the cell that has received the active TCI indication. For the RRC configuration, the SSB setting of the serving cell can be used for the other cells being activated.

In certain embodiments, a UE that supports auto-continuation behavior, as disclosed herein, may indicate to the NW in a UE capability message that the autonomous behavior can be triggered by one TCI indication to one serving cell being-activated.

In certain embodiments, the NW can distinguish different UEs based on UE capability reports to send one or multiple TCI indications (i.e., one TCI indication per cell) to a UE accordingly for activating multiple serving cells pending on the TCI provisions.

FIG. 3 is a flowchart of a method 300 for a UE to communicate in a wireless network according to one embodiment. In block 302, the method 300 includes receiving, from the wireless network, a command to activate multiple cells simultaneously. The command may be, for example, a MAC-CE command. In block 304, in response to the command, the method 300 includes initiating cell activation procedures for the multiple cells. The cell activation procedures include waiting for an active TCI indication. In block 306, the method 300 includes monitoring for the active TCI indication on any of the multiple cells. In block 308, in response to receiving the active TCI indication on a first cell of the multiple cells, the method 300 includes determining one or more second cells of the multiple cells that share a same spatial relationship with the first cell according to one or more predetermined rule, and (in block 310) autonomously continuing the cell activation procedures for the first cell and the one or more second cells. In block 312, the method 300 includes receiving, at the UE from the wireless network, downlink communication on the first cell and the one or more second cells.

In certain embodiments, the method 300 further comprises defining, based on the one or more predetermined rule, the first cell and the one or more second cells as being in a TCI cell group with a same TCI state.

In certain embodiments of the method 300, the one or more predetermined rule comprises the first cell and the one or more second cells being in a same frequency band in a first frequency range (FR1), and wherein the first cell and the one or more second cells comprise frequency contiguous serving cells sharing a same downlink spatial filter at the UE.

In certain embodiments of the method 300, the one or more predetermined rule comprises the first cell and the one or more second cells being in a same frequency band wherein the same frequency band is in a second frequency range (FR2), and wherein the first cell and the one or more second cells share a same downlink spatial filter at the UE.

In certain embodiments of the method 300, the one or more predetermined rule comprises a predefined criteria set between the wireless network and the UE. In certain such embodiments, the predefined criteria comprises assuming that consecutively numbered cell identifiers (IDs) in a frequency band are spatially co-located.

In certain embodiments of the method 300, autonomously continuing the cell activation procedures comprises selectively determining, for each of the one or more second cells, whether one or more additional conditions trigger a continuation the cell activation procedures. For example, the one or more additional conditions may be based on synchronization signal block (SSB) measurements to determine quasi co-location (QCL) of the first cell with the one or more second cells. Or, the one or more additional conditions may be based on a radio resource configuration (RRC) configuration of synchronization signal block (SSB) settings between the first cell and the one or more second cells.

In certain embodiments, the method 300 further comprises reporting, from the UE to the wireless network, a UE capability message indicating support by the UE for autonomous continuation of multiple cell activation based on a single TCI indication.

Embodiments contemplated herein include an apparatus comprising means to perform one or more elements of the method 300. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 300. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 602 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

FIG. 4 is a flowchart of a method 400 for a base station to communicate with a UE in a wireless network according to one embodiment. In block 402, the method 400 includes receiving, from the UE, a UE capability message indicating support by the UE for autonomous continuation of multiple cell activation based on a single transmission configuration indicator (TCI) indication. In block 404, the method 400 includes transmitting, from the base station to the UE, a command to initiate cell activation procedures for multiple cells. The cell activation procedures include waiting for an active TCI indication. In block 406, based on the UE capability message, the method 400 includes transmitting the active TCI indication to the UE on a first cell of the multiple cells to continue the cell activation procedures for the first cell and one or more second cells of the multiple cells that share a same spatial relationship with the first cell according to one or more predetermined rule.

In certain embodiments, the method 400 further includes defining, based on the one or more predetermined rule, the first cell and the one or more second cells as being in a TCI cell group with a same TCI state.

In certain embodiments of the method 400, the one or more predetermined rule comprises the first cell and the one or more second cells being in a same frequency band in a first frequency range (FR1), and wherein the first cell and the one or more second cells comprise frequency contiguous serving cells sharing a same downlink spatial filter at the UE.

In certain embodiments of the method 400, the one or more predetermined rule comprises the first cell and the one or more second cells being in a same frequency band wherein the same frequency band is in a second frequency range (FR2), and wherein the first cell and the one or more second cells share a same downlink spatial filter at the UE.

In certain embodiments of the method 400, the one or more predetermined rule comprises a predefined criteria set between the wireless network and the UE. In certain such embodiments, the predefined criteria comprises assuming that consecutively numbered cell identifiers (IDs) in a frequency band are spatially co-located.

In certain embodiments, the method 400 further includes: determining one or more third cells of the multiple cells that do not share the same spatial relationship with the first cell according to one or more predetermined rule; and transmitting, from the base station to the UE, additional active TCI indications for each of the one or more third cells.

Embodiments contemplated herein include an apparatus comprising means to perform one or more elements of the method 400. This apparatus may be, for example, an apparatus of a base station (such as a network device 618 that is a base station, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a base station (such as a memory 622 of a network device 618 that is a base station, as described herein).

Embodiments contemplated herein include an apparatus comprising logic, modules, or circuitry to perform one or more elements of the method 400. This apparatus may be, for example, an apparatus of a base station (such as a network device 618 that is a base station, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a base station (such as a network device 618 that is a base station, as described herein).

Embodiments contemplated herein include a signal as described in or related to one or more elements of the method 400.

Embodiments contemplated herein include a computer program or computer program product comprising instructions, wherein execution of the program by a processing element is to cause the processing element to carry out one or more elements of the method 400. The processor may be a processor of a base station (such as a processor(s) 620 of a network device 618 that is a base station, as described herein). These instructions may be, for example, located in the processor and/or on a memory of the base station (such as a memory 622 of a network device 618 that is a base station, as described herein).

Figure 5:
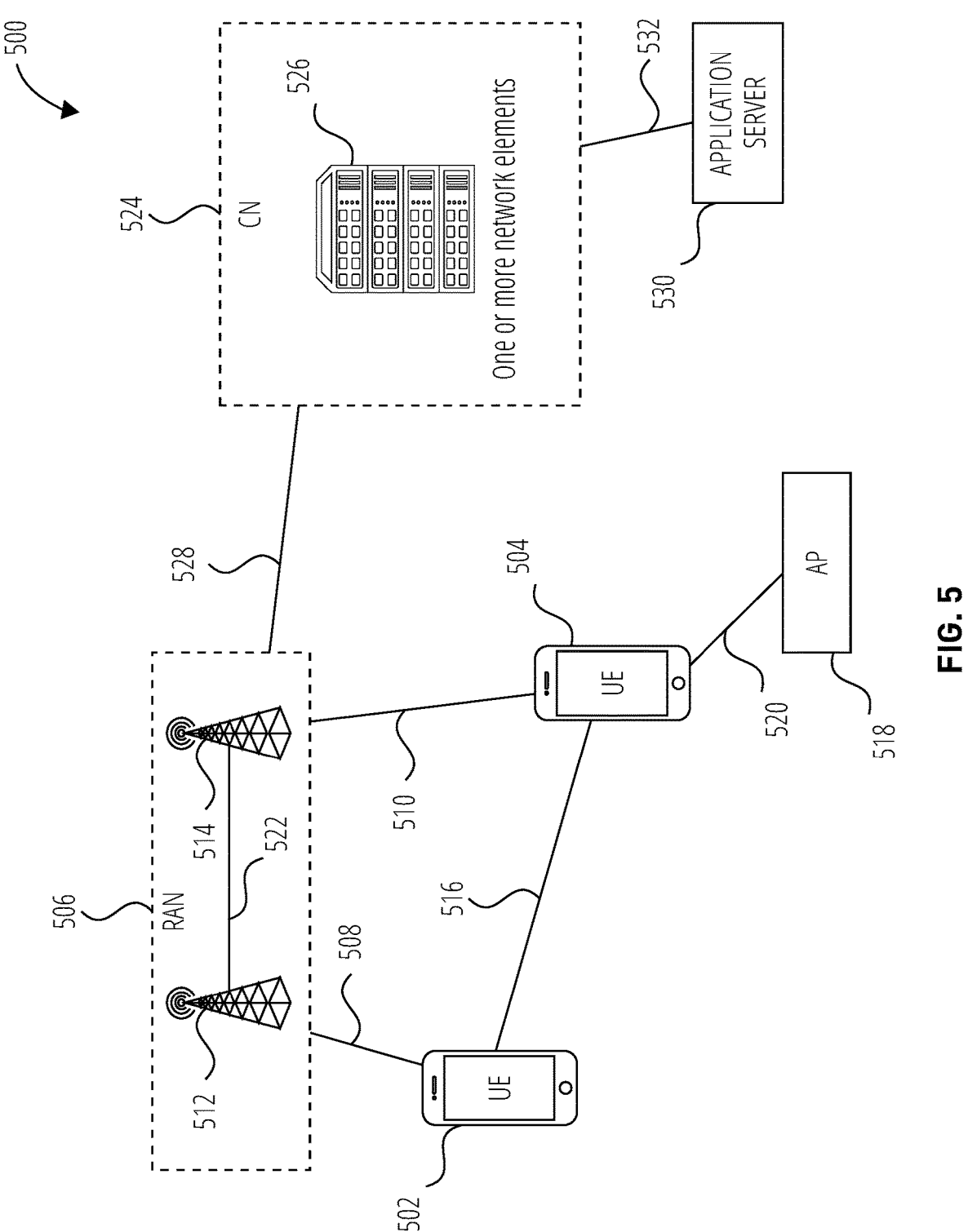
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations (such as base station 512 and base station 514) that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
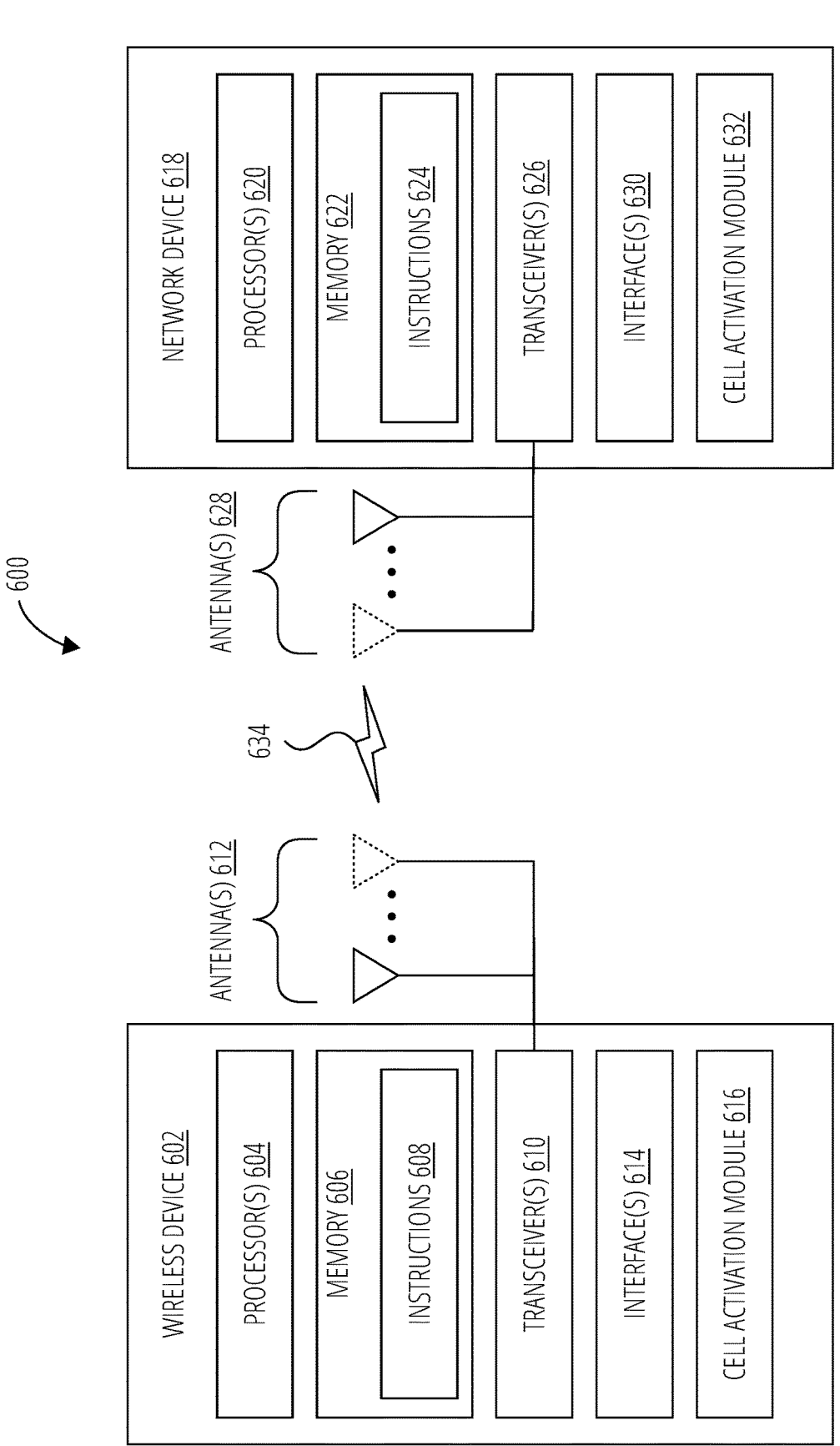
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a cell activation module 616. The cell activation module 616 may be implemented via hardware, software, or combinations thereof. For example, the cell activation module 616 may be implemented as a processor, circuit, and/or instructions 608 stored in the memory 606 and executed by the processor(s) 604. In some examples, the cell activation module 616 may be integrated within the processor(s) 604 and/or the transceiver(s) 610. For example, the cell activation module 616 may be implemented by a combination of software components (e.g., executed by a DSP or a general processor) and hardware components (e.g., logic gates and circuitry) within the processor(s) 604 or the transceiver(s) 610.

The cell activation module 616 may be used for various aspects of the present disclosure, for example, aspects of FIG. 2 and FIG. 3.

The network device 618 may include one or more processor(s) 620. The processor(s) 620 may execute instructions such that various operations of the network device 618 are performed, as described herein. The processor(s) 620 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a cell activation module 632. The cell activation module 632 may be implemented via hardware, software, or combinations thereof. For example, the cell activation module 632 may be implemented as a processor, circuit, and/or instructions 624 stored in the memory 622 and executed by the processor(s) 620. In some examples, the cell activation module 632 may be integrated within the processor(s) 620 and/or the transceiver(s) 626. For example, the cell activation module 632 may be implemented by a combination of software components (e.g., executed by a DSP or a general processor) and hardware components (e.g., logic gates and circuitry) within the processor(s) 620 or the transceiver(s) 626.

The cell activation module 632 may be used for various aspects of the present disclosure, for example, aspects of FIG. 2 and FIG. 4.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to communicate in a wireless network, the method comprising:

receiving, from the wireless network, a command to activate multiple cells simultaneously;

in response to the command, initiating cell activation procedures for the multiple cells, wherein the cell activation procedures include waiting for an active transmission configuration indicator (TCI) indication;

monitoring for the active TCI indication on any of the multiple cells;

in response to receiving the active TCI indication on a first cell that is to be activated of the multiple cells:

determining one or more second cells that are to be activated of the multiple cells that share a same spatial relationship with the first cell according to one or more predetermined rule; and using the active TCI indication to complete the cell activation procedures for both the first cell that is to be activated and the one or more second cells that are to be activated; and receiving, at the UE from the wireless network, downlink communication on the first cell and the one or more second cells.

2. The method of claim 1, further comprising defining, based on the one or more predetermined rule, the first cell and the one or more second cells as being in a TCI cell group with a same TCI state.

3. The method of claim 1, wherein the one or more predetermined rule comprises the first cell and the one or more second cells being in a same frequency band in a first frequency range (FR1), and wherein the first cell and the one or more second cells comprise frequency contiguous serving cells sharing a same downlink spatial filter at the UE.

4. The method of claim 1, wherein the one or more predetermined rule comprises the first cell and the one or more second cells being in a same frequency band wherein the same frequency band is in a second frequency range (FR2), and wherein the first cell and the one or more second cells share a same downlink spatial filter at the UE.

5. The method of claim 1, wherein the one or more predetermined rule comprises a predefined criteria set between the wireless network and the UE.

6. The method of claim 5, wherein the predefined criteria comprises assuming that consecutively numbered cell identifiers (IDs) in a frequency band are spatially co-located.

7. The method of claim 1, wherein autonomously continuing the cell activation procedures comprises selectively determining, for each of the one or more second cells, whether one or more additional conditions trigger a continuation the cell activation procedures.

8. The method of claim 7, wherein the one or more additional conditions are based on synchronization signal measurements to determine quasi co-location (QCL) of the first cell with the one or more second cells.

9. The method of claim 8, wherein the synchronization signal measurements comprise one or more of synchronization signal block (SSB) measurements and channel state information reference signal (CSI-RS) measurements.

10. The method of claim 7, wherein the one or more additional conditions are based on a radio resource configuration (RRC) configuration of synchronization signal settings between the first cell and the one or more second cells.

11. The method of claim 10, wherein the synchronization signal settings comprise one or more of synchronization signal block (SSB) settings and channel state information reference signal (CSI-RS) settings.

12. The method of claim 1, further comprising reporting, from the UE to the wireless network, a UE capability message indicating support by the UE for autonomous continuation of multiple cell activation based on a single TCI indication.

13. A method for a base station to communicate with a user equipment (UE) in a wireless network, the method comprising:

receiving, from the UE, a UE capability message indicating support by the UE for autonomous continuation of multiple cell activation based on a single transmission configuration indicator (TCI) indication;

transmitting, from the base station to the UE, a command to initiate cell activation procedures for multiple cells, wherein the cell activation procedures include waiting for an active TCI indication; and based on the UE capability message, transmitting the active TCI indication to the UE on a first cell that is to be activated of the multiple cells to complete the cell activation procedures for the first cell that is to be activated and one or more second cells that are to be activated of the multiple cells that share a same spatial relationship with the first cell according to one or more predetermined rule.

14. The method of claim 13, further comprising defining, based on the one or more predetermined rule, the first cell and the one or more second cells as being in a TCI cell group with a same TCI state.

15. The method of claim 13, wherein the one or more predetermined rule comprises the first cell and the one or more second cells being in a same frequency band in a first frequency range (FR1), and wherein the first cell and the one or more second cells comprise frequency contiguous serving cells sharing a same downlink spatial filter at the UE.

16. The method of claim 13, wherein the one or more predetermined rule comprises the first cell and the one or more second cells being in a same frequency band wherein the same frequency band is in a second frequency range (FR2), and wherein the first cell and the one or more second cells share a same downlink spatial filter at the UE.

17. The method of claim 13, wherein the one or more predetermined rule comprises a predefined criteria set between the wireless network and the UE.

18. The method of claim 17, wherein the predefined criteria comprises assuming that consecutively numbered cell identifiers (IDs) in a frequency band are spatially co-located.

19. The method of claim 13, further comprising:

determining one or more third cells of the multiple cells that do not share the same spatial relationship with the first cell according to the one or more predetermined rule; and transmitting, from the base station to the UE, additional active TCI indications for each of the one or more third cells.

* * * * *